Figure 1A:
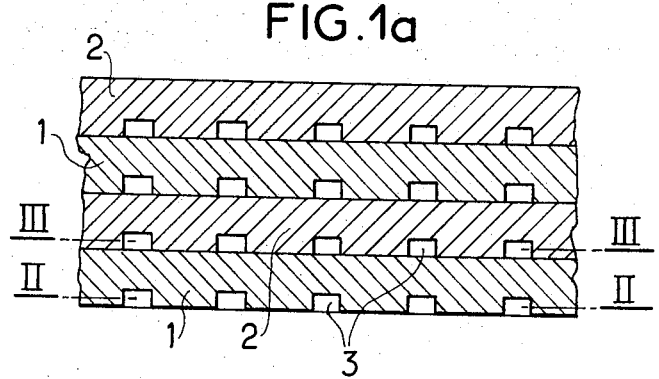

United States Patent [19]
Lehuen et al.

[11] 3,778,649
[45] Dec. 11, 1973

[54] ROTOR WINDING FOR ELECTRICAL MACHINES WITH GROOVED CONDUCTORS

[75] Inventors: Christian Lehuen, Cravanche; Roger Gillet, Belfort, both of France

[73] Assignee: Societe Generale De Constructions Electriques Et Mecaniques (Alsthom), Paris, France

[22] Filed: July 10, 1972

[21] Appl. No.: 270,033

[30] Foreign Application Priority Data
July 8, 1971  France .............................. 7125140

[52] U.S. Cl. ................................................ 310/61
[51] Int. Cl. ............................................ H02k 1/32
[58] Field of Search .................. 310/55, 61, 64, 65, 310/264

[56] References Cited
UNITED STATES PATENTS
3,660,702   5/1972   Kishino................................ 310/61
2,986,664   5/1961   Willyoung............................ 310/61
2,965,777   12/1960  Jaeschke............................ 310/61 X
1,819,228   8/1931   Coates............................... 310/61 X Primary Examiner—J. D. Miller
Assistant Examiner—Mark O. Budd
Attorney—Paul M. Craig, Jr. et al.

[57]  ABSTRACT

The invention relates to the rotors of electrical machines, and particularly to a cooling arrangement therefor providing a circulation of cooling gas through a stack of grooved conductors. It is characterized in that the grooves in the conductors are curvilinear and the ends thereof are placed opposite each other. The invention is applicable notably to conductors disposed in rotor slots, which eliminates any risk of shearing of the conductors.

7 Claims, 6 Drawing Figures

PATENTED DEC 11 1973　　　　　　　　　　　　　　3,778,649

ROTOR WINDING FOR ELECTRICAL MACHINES WITH GROOVED CONDUCTORS

The present invention relates to the rotors of electrical machines, and particularly to a cooling arrangement providing a circulation of cooling gas through a radial stack of conductors from one edge of the stack to the other. More particularly, the invention relates to rotors in which the transverse channels disposed in the stack of conductors are obtained by using grooved or notched conductors.

One disadvantage of the rectilinear grooves or notches proposed to date resides in the fact that, if they have the same inclination from one conductor to the next-following conductor in the stack, the shearing stresses to which the conductors are subjected in the course of operation of the machine may lead to ruptures or breaking, if two consecutive conductors are axially shifted by half a pitch of the grooves. This danger may be avoided by using grooves that are oblique, rather than perpendicular, with respect to the longitudinal axis of the conductor, and a different inclination of the grooves from one conductor to the next-following one. But this arrangement requires the provision of conductors with two types of grooves. On the other hand, with oblique grooves, the inlet of the transverse channel is not in the same orthogonal plane with respect to the longitudinal axis of the conductor as the outlet of the same channel, and if the stack is disposed in a notch, the wedges that may be placed between the edges of the notch and the stack of conductors close different transverse channels and thereby greatly reduce the effectiveness of the cooling, which they would not do if the grooves were perpendicular to the longitudinal axis of the conductor.

It has been found, according to the present invention, that the risk of shearing the conductors may be avoided without incurring the drawbacks referred to hereinabove. For this purpose, a rotor winding for an electrical machine is provided comprising radial stacks of grooved conductors which provide transverse passages for a cooling gas, characterized in that the inlet and the outlet of each groove are situated substantially in the same orthogonal plane with respect to the longitudinal axis of the conductor, in that between this inlet and this outlet the trace of the groove is curvilinear, and in that the conductors of the stack all have the same grooves but are disposed, from one conductor to the next-following one, in inverse longitudinal directions.

The outline or shape of each groove is preferably that of a circular arc or of a chevron since this form makes it possible to maintain an excellent ventilation.

Figure 1B:
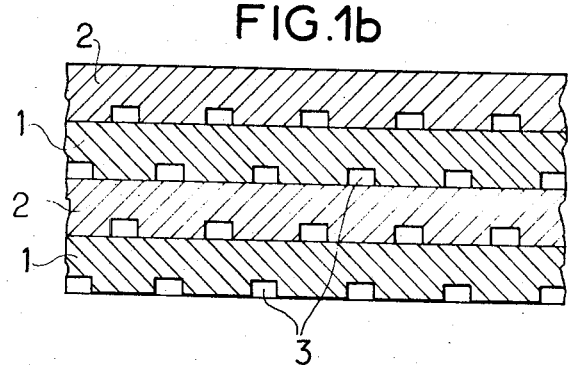
Figure 2:
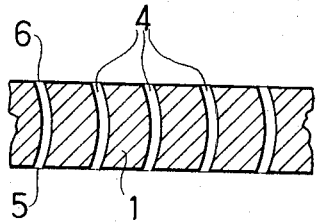
Figure 3:
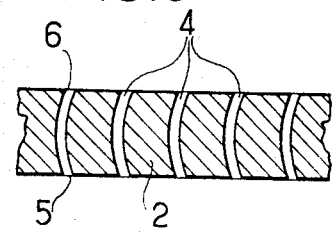
Figure 4:
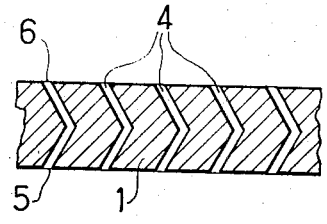
Figure 5:
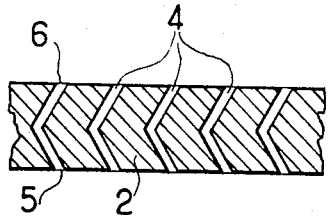

Examples of the present invention, which have been given solely by way of illustration and are not to be construed in a limiting manner, will now be further described hereinafter taken in connection with the accompanying schematic drawings, wherein:

FIGS. 1a and 1b each represent a partial longitudinal and vertical cross-sectional view through a stack of conductors;

FIGS. 2 and 3 represent a partial longitudinal and horizontal cross-sectional view of an example of conductors which may make up this stack, and FIGS. 4 and 5 represent a partial longitudinal and horizontal cross-sectional view of another example of conductors which may make up this stack.

With reference to FIG. 1a or FIG. 1b, there is illustrated a stack of successive grooved conductors 1 and 2 which make up, or form, between each other, by virtue of the grooves therein, transverse passages 3 which are used for cooling by circulation of a gas. This stack of conductors is mounted on the rotor of an electrical machine and may notably be disposed inside a notch, with the cooling gas arriving from one side of the stack between the latter and one wall of the notch, and leaving or issuing from the other side of the stack between the latter and the other notch wall, after having traversed the stack via the passages 3, perpendicularly to the figure.

In the stack shown in FIG. 1a, there is no risk of a shearing of the conductors since the grooves are perfectly superimposed. If, on the other hand, due to an irregular pitch of the grooves, an offset arrangement of the grooves should be produced, such as shown in FIG. 1b, the conductors equipped with orthogonal grooves are subject to shearing. It is this shearing action which the present invention intends to avoid with the aid of grooves such as those shown in FIGS. 2 to 5.

FIGS. 2 and 3 illustrate conductors 1 and 2, as seen respectively along lines II—II and III—III OF FIG. 1a, whose grooves 4 have the form of a circular arc and open on the sides of the conductor at points 5 and 6 positioned opposite each other. The conductors 1 and 2 are identical but have been inverted in the longitudinal direction with respect to each other.

The same holds true for the conductors 1 and 2 of the example given in FIGS. 4 and 5, which also represent, respectively, cross-sectional views taken along lines II—II and III—III of FIG. 1a, wherein the grooves 4 have the form of chevrons instead of circular arcs.

It is seen accordingly that, when a conductor 2 is mounted on a conductor 1, it is possible to have the points 5 or 6 of the two conductors coincide, but the grooves 4 of one of the conductors will be positioned on one side, and those of the other conductor will be positioned on the other side of the line 5–6, which limits the risks of shearing.

While there have been shown and described but specific embodiments of the invention, it will be understood by those skilled in the art that the invention is not limited thereto or thereby.

What is claimed is:

1. A rotor winding for electrical machines comprising radial stacks of grooved conductors in which are formed transverse passages for a cooling gas, the inlet and the outlet of each groove being situated essentially, in the same orthogonal plane with respect to the longitudinal axis of the conductor, between the inlet and the outlet the shape of the groove being curvilinear.

2. A rotor winding for electrical machines according to claim 1 wherein the conductors of the stack all have the same grooves but the grooves are disposed, from one to the next adjacent one, in inverted longitudinal directions.

3. A rotor winding for electrical machines according to claim 1 wherein the shape of each groove is that of a circular arc.

4. A rotor winding for electrical machines according to claim 1 wherein the shape of each groove is that of a chevron.

5. A rotor winding for electrical machines according to claim 1, wherein the radial stack of grooved conductors include a plurality of conductors stacked one on another in the radial direction and the transverse passages are formed by individual grooves extending completely through a respective conductor in a direction transverse to the radially extending stack of conductors.

6. A rotor winding for electrical machines according to claim 5, wherein each conductor is provided with a plurality of transversely extending grooves, each groove being spaced from an adjacent groove and having a single inlet and a single outlet, the single inlet and single outlet for each groove being joined only by way of a continuous curvilinear passageway.

7. A rotor winding for electrical machines according to claim 1, wherein the transverse passages of the radial stack of conductors are arranged such that the inlet and outlet of a respective groove in each conductor in the radial stack of conductors lies in the same orthogonal plane extending perpendicular to the longitudinal axis of the conductors.

* * * * *